Figure 1:
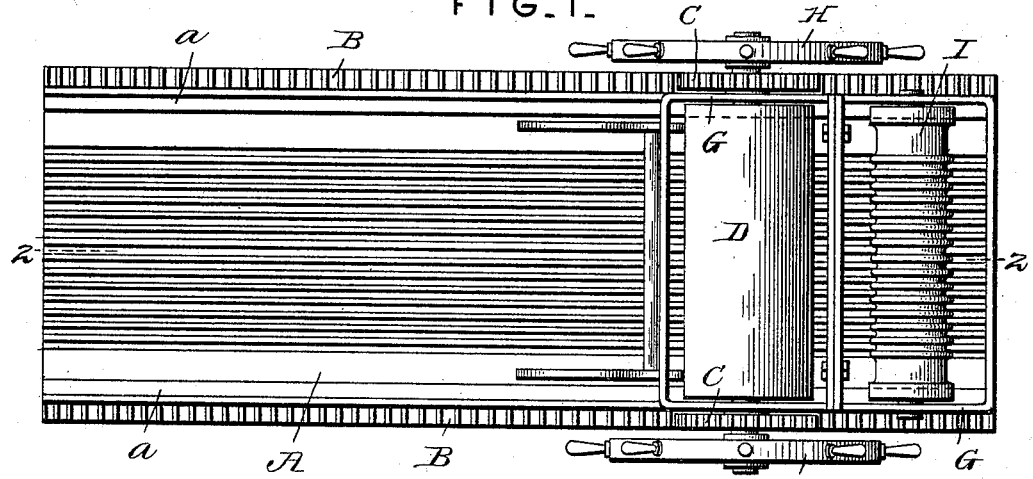

No. 689,047. Patented Dec. 17, 1901.
C. C. HARTUNG.
METHOD OF MAKING CORRUGATED GLASS.
(Application filed Oct. 18, 1900.)
(No Model.) 2 Sheets—Sheet 1.

ATTEST- INVENTOR-
Charles C. Hartung.
By Bakewell & Cornwall
Atty's.

No. 689,047. Patented Dec. 17, 1901.
C. C. HARTUNG.
METHOD OF MAKING CORRUGATED GLASS.
(Application filed Oct. 18, 1900.)
(No Model.) 2 Sheets—Sheet 2.
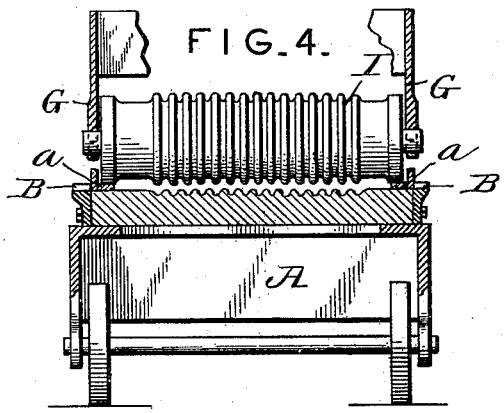
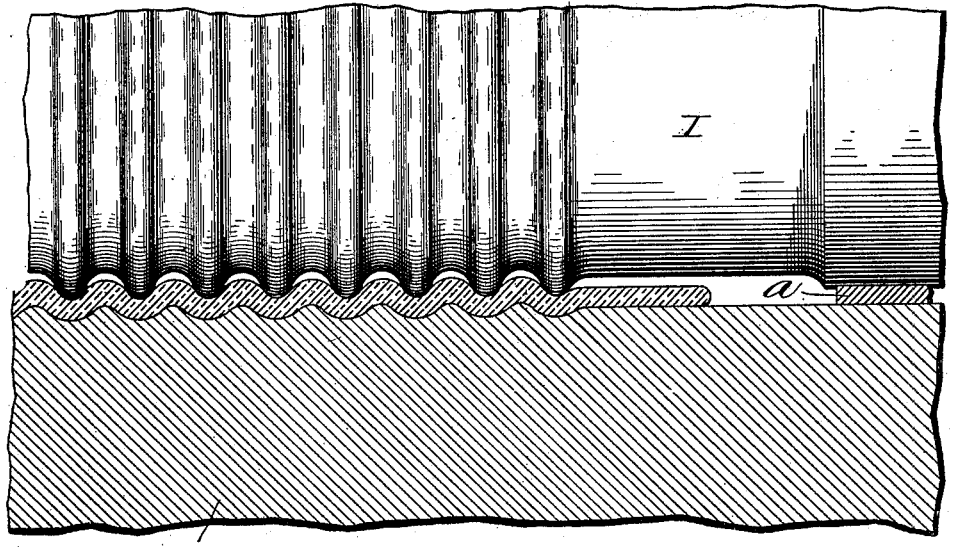
ATTEST- INVENTOR-
Charles C. Hartung.
By Bakewell & Cornwall
Atty's.

UNITED STATES PATENT OFFICE.

CHARLES C. HARTUNG, OF ST. LOUIS, MISSOURI, ASSIGNOR TO MISSISSIPPI VALLEY TRUST COMPANY, ADMINISTRATOR OF EDWARD WALSH, JR., DECEASED, LATE OF ST. LOUIS, MISSOURI.

METHOD OF MAKING CORRUGATED GLASS.

SPECIFICATION forming part of Letters Patent No. 689,047, dated December 17, 1901.

Application filed October 18, 1900. Serial No. 33,459. (No specimens.)

*To all whom it may concern:*

Be it known that I, CHARLES C. HARTUNG, a citizen of the United States, residing at the city of St. Louis, State of Missouri, have invented a certain new and useful Improvement in Methods of Making Corrugated Glass, of which the following is a full, clear, and exact description, such as will enable others skilled in the art to which it appertains to make and use the same, reference being had to the accompanying drawings, forming part of this specification.

This invention relates to a new and useful method of making corrugated sheet-glass, the invention being particularly, though not exclusively, designed for use in connection with the manufacture of double-corrugated glass—that is, glass wherein both sides are corrugated.

The object of this present invention is to manufacture corrugated glass in such manner as to dispense with the irregularities and cracks usually in glass of this character made with a corrugated roller, wherein the depths of the corrugations on the roller are coincident with the corrugations formed on the glass, such as illustrated in the patent granted to Edward Walsh, jr., December 13, 1892, No. 487,803. In practicing the invention according to the construction shown and described in said Patent No. 487,803, wherein the roller is corrugated conversely to the corrugations appearing on the resultant sheet of glass, there is such a difference in the circumferential speed on the convex portions of the corrugations of the roller and the concave portions thereof that the surface of the glass is disturbed, and if sufficiently hot to be fluid ridges or lumps will be formed, and if the surface of the glass is chilled the convex portions of the roller in pressing the glass down will skin-draw the glass, so that the corrugations in the sheet of glass will crack transversely. By my present invention I obviate these objections and produce a sheet of double corrugated glass free from flaws, such as above described.

My present invention consists, generally stated, in the method of corrugating glass, as will hereinafter be described and afterward pointed out in the claims.

In practicing my present invention I prefer that the glass shall be sufficiently hot as to slightly flow after the passage of the corrugating medium, whereby inequalities will be corrected by the molten glass itself.

Figure 2:
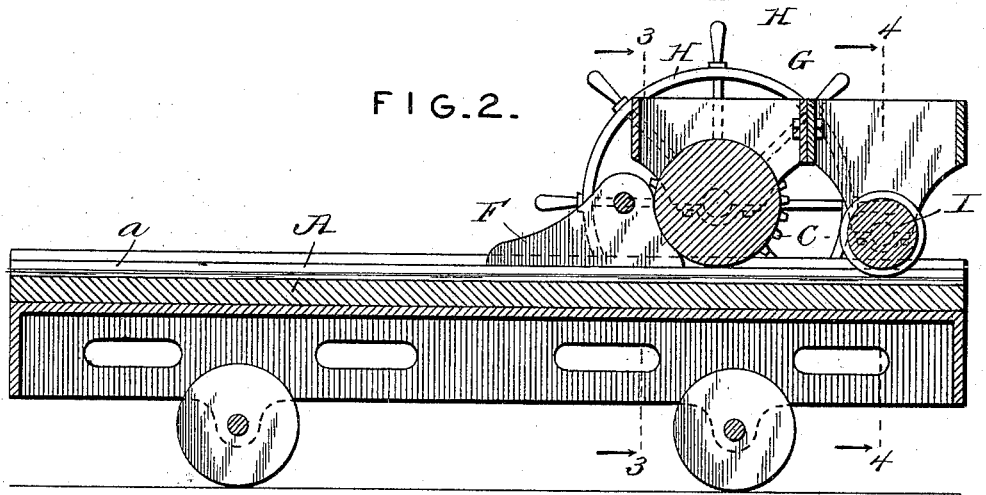
Figure 3:
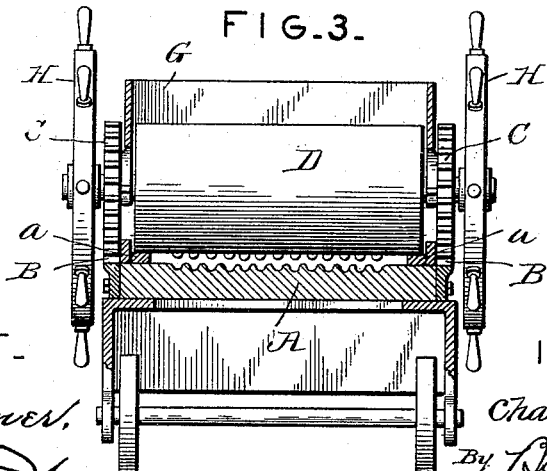

In the drawings, Figure 1 is a plan view of a glass-rolling machine. Fig. 2 is a vertical sectional view on line 2 2, Fig. 1. Fig. 3 is a vertical sectional view on line 3 3, Fig. 2. Fig. 4 is a sectional view on line 4 4, Fig. 2. Fig. 5 is a detail view, full size, illustrating the operation of the corrugated roller; and Fig. 6 is a cross-sectional view through a sheet of corrugated glass.

In the accompanying drawings I have illustrated an apparatus adapted for use in practicing my improved method; but it is obvious that there are other forms of apparatus which can be as successfully employed for such purposes, and therefore I do not wish to be understood as limiting myself to practicing my improved method with the apparatus shown and hereinafter described.

Referring now to the accompanying drawings, A indicates a table, preferably corrugated longitudinally, on each side of which are arranged spacing-strips $a$, upon which the rollers rest, said spacing-strips regulating the thickness of the sheet of glass.

B indicates the racks on each side of the table, with which mesh gears C, conjoined to the main roller D. This "main roller," as I have called it, is a smooth-surfaced roller resting upon the strips $a$, in front of which in the operation of the machine molten glass is placed, the usual running-frame F being employed in advance thereof to define the width of the sheet of glass.

H indicates the hand-wheels conjoined to the plain roller, by which the same may be manually operated to traverse the table. If desired, however, a motor may be employed in connection with the roller, as is well understood.

G indicates the carriage embracing the ends of the plain roller, said carriage having mounted in its rear end the corrugated roller I. This corrugated roller is preferably provided with plain ends designed to rest upon the strips $a$, while the middle portion thereof is corrugated, as shown in Fig. 5, wherein it will be seen that the projecting portions of the corrugations register with the grooves of the table, while the spaces between said projecting portions of the corrugations are deepened, so as not to contact with the molten glass being operated upon.

In operation the molten glass being placed in advance of the plain roller will be spread over the table, thereby filling the corrugations of the table-bed and producing a sheet of glass having one surface (the under) corrugated by the table. The following corrugated roller I operates upon the upper or plain surface of the sheet of molten glass, its corrugations embedding themselves in said plain surface of the molten glass and dislodging the molten glass, forcing it up into (but not filling) the spaces between the roller-corrugations. After the corrugated roller I has passed over the glass I prefer that the glass shall be sufficiently molten to slightly flow for the purpose of effacing the lines of contact of the projecting portions of the corrugations of roller I therewith. After the sheet of glass is corrugated, as above described, it is taken from the table and run through the annealing lear or kiln, as is usual.

Having thus described my invention, what I claim, and desire to secure by Letters Patent, is—

1. The method herein described of producing corrugated glass which consists in first spreading the molten glass in the form of a sheet, then rolling the smooth upper face, laterally displacing the molten glass to form the parallel raised projections on the glass and simultaneously exposing the surfaces of said raised projections to the air, and then permitting said glass to set in corrugated form; substantially as described.

2. The method herein described of producing corrugated glass which consists in first spreading the molten glass in sheet form, then displacing the upper smooth surface thereof in opposite directions to form the convexes of the corrugations and simultaneously exposing said convexes to the air, then permitting the glass between said convexes to flow and obliterate lines formed in the surface of the glass by the before-mentioned step of corrugating, and then permitting said glass to set in corrugated form; substantially as described.

In testimony whereof I hereunto affix my signature, in the presence of two witnesses, this 3d day of October, 1900.

CHARLES C. HARTUNG.

Witnesses:
F. R. CORNWALL,
WM. H. SCOTT.